(No Model.) 2 Sheets—Sheet 1.

T. VAN KANNEL.
COOKER.

No. 556,787. Patented Mar. 24, 1896.

Witnesses:

Inventor:
Theophilus Van Kannel,
by Dyrenforth & Dyrenforth,
Attorneys.

(No Model.) 2 Sheets—Sheet 2.

T. VAN KANNEL.
COOKER.

No. 556,787. Patented Mar. 24, 1896.

Witnesses:
J. H. Lee
M. J. Frost

Inventor:
Theophilus Van Kannel,
by Dyrenforth & Dyrenforth,
Attorneys.

UNITED STATES PATENT OFFICE.

THEOPHILUS VAN KANNEL, OF ROCKFORD, ILLINOIS.

COOKER.

SPECIFICATION forming part of Letters Patent No. 556,787, dated March 24, 1896.

Application filed May 13, 1895. Serial No. 549,034. (No model.)

*To all whom it may concern:*

Be it known that I, THEOPHILUS VAN KANNEL, a citizen of the United States, residing at Rockford, in the county of Winnebago and State of Illinois, have invented a new and useful Improvement in Cookers, of which the following is a specification.

My invention relates to an improvement in the class of cookers for cooking canned goods, and more especially canned vegetables and fruits.

The primary object of my invention is to provide, in the class referred to, a cooker which shall be continuously operative in the sense that it shall be adapted to be charged with a supply of cans the contents of which are to be cooked and discharged of cans the contents of which have been subjected to the action of the cooker and finished without interrupting or in any way interfering with its operation on the contents of cans still undergoing cooking in the apparatus. By these means the operation is rendered economical both in the matter of time and in that of avoiding waste of heat and enables different materials requiring subjection to the heat of boiling water for varying periods for cooking them to be timed to a nicety and the contents of all the cans of a charge to be uniformly cooked.

My invention consists in the general as well as in the detailed construction of my improved cooker.

Generally stated, my improved cooker comprises, as its construction, a tank affording a boiler, which should be closed on all sides, except for a vent to permit the escape of steam and an inlet and discharge for the cans, and containing a vertically-rotating carrier on which to seat the cans containing the material to be cooked, the tank holding the liquid (preferably water) which is heated adequately to effect the cooking and in which the cans are revolved by the rotating carrier, the rotation being, by preference, so timed and therefore so slow that the cooking shall be accomplished in one complete revolution of the carrier, thus enabling a set of cans to be removed after their contents have been cooked and to be replaced by another set containing the material to be cooked without stopping the motion of the carrier.

Figures 1, 2:
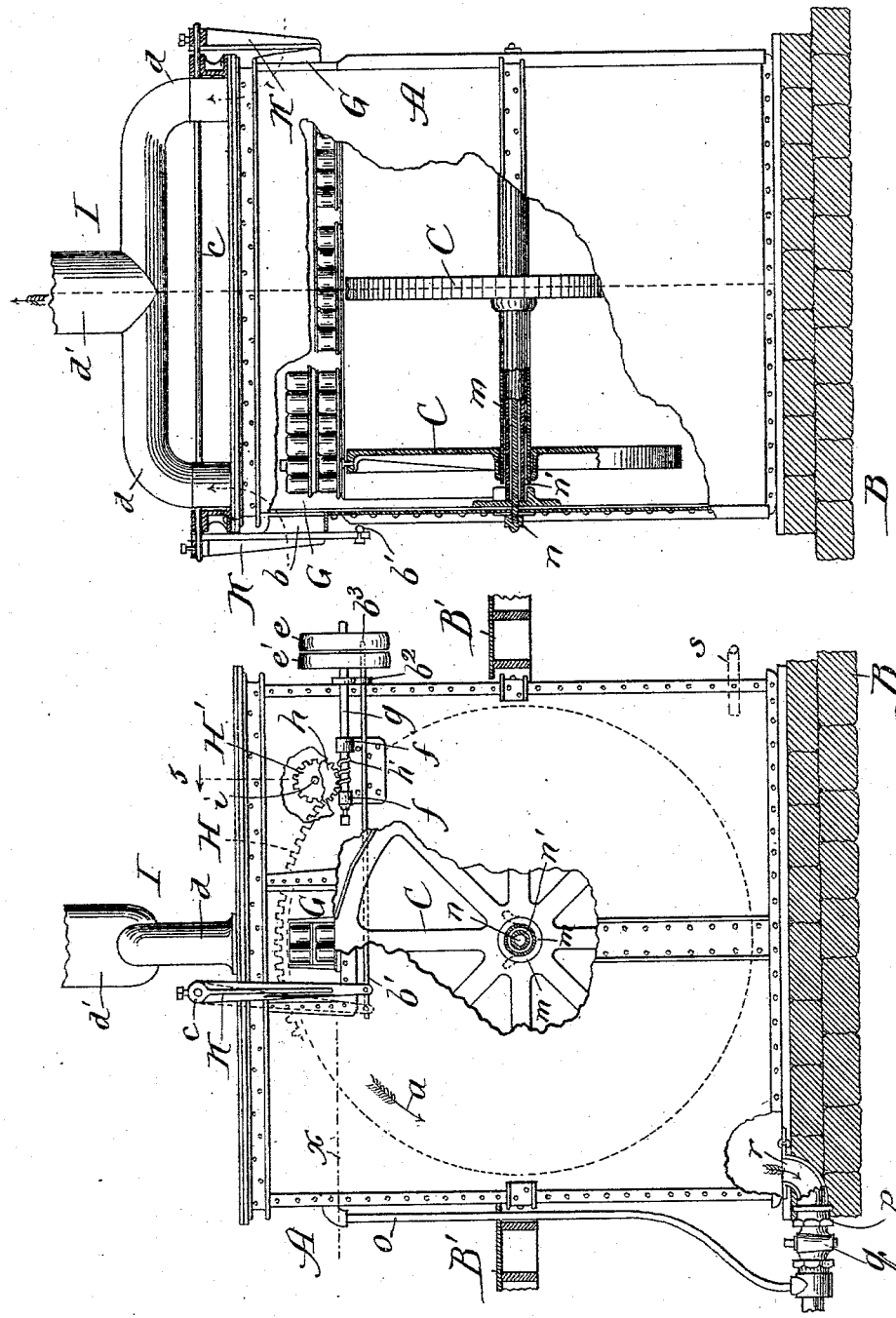
Figure 3:
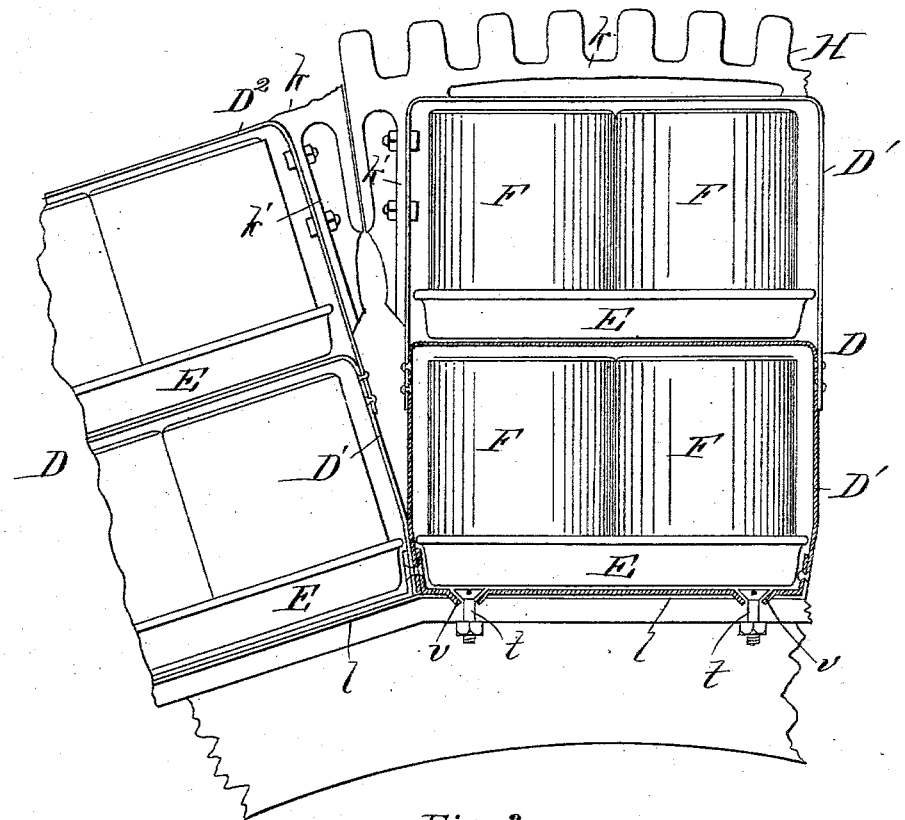
Figure 4:
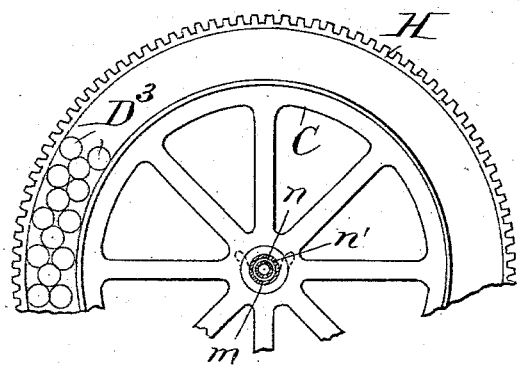
Figure 5:
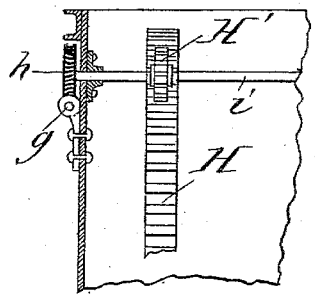

Referring to the accompanying drawings, Figure 1 shows my improved cooker by a view in elevation, partly broken and sectional. Fig. 2 is a view like that presented by Fig. 1, but regarded at a right angle to the latter; Fig. 3, an enlarged broken sectional view showing details; Fig. 4, a broken view showing a modification, and Fig. 5 a broken section taken at the line 5 on Fig. 1 and viewed in the direction of the arrow.

A is the tank affording the boiler (shown as of rectangular shape) and which I prefer to form of metal. As represented, the tank extends from the foundation B, upon which it rests on the ground at such depth below the floor B' in a building (not shown) as to bring the openings G, hereinafter described, within convenient reach of the operator; and the tank is provided at its base with an outlet $r$ for drawing off, when desired, the water contained in the tank for boiling, the outlet being provided with a discharge-pipe $p$ equipped with a shut-off valve $q$, beyond which there enters it an overflow-pipe $o$ leading from the level of the water-line (indicated at $x$) in the boiler.

Extending from one side to the other of the tank, at or near its transverse center, is a metal rod $n$, fastened at its ends in the opposite sides to tie them together and reinforced by a surrounding stationary tube $n'$ of metal, which in turn is loosely surrounded by a metal sleeve $m$. On the sleeve $m$, which affords a rotatable shaft, are fastened at their hubs wheels C, preferably three in number, at equal distances apart and of similar construction, being formed, by preference, of cast metal, with their flanged peripheries flattened circumferentially to afford on each a desired number of straight seats $l$, which may be of equal length for the cells hereinafter described.

D D are the cells, which I prefer to form of sheet metal, and each in at least two tiers D' and $D^2$, (see Fig. 3,) open at their opposite ends to receive at one end and permit the discharge at the other end of trays E, the preferred dimensions of which are such as to adapt each to contain a dozen cans F, seated thereon in two parallel rows and which contain, hermetically sealed within them, the material to be cooked. The cells D are fastened at their bases on the seats $l$, provided on the wheels C, which thus afford a carrier for the cans, as by means of bolts $t$ passed through the peripheral flanges of the wheels in which the bolt-heads should be countersunk to draw into the depressions the metal of the bases of the cells, as shown at $v$ in Fig. 3; and the length of each open-ended cell D is such as to cause it to rest near its ends on the outer wheels C and between its ends on the intermediate wheel C, whereby the cells extend radially from the rotary carrier. In the two opposite sides of the tank A which are at right angles to the plane of rotation of the carrier I provide the flanged openings G (only one of which is clearly shown, owing to the nature of the views selected for illustration) in alignment with each other and preferably of rectangular shape, with their bases on a horizontal plane with those of the bottoms of the lower tiers of the cells, when brought by the rotation of the carrier into their upright horizontal position.

As the means for driving the rotary carrier I show a cog-wheel H inside the tank, formed in segments $k$, each provided at its opposite ends with converging arms $k'$ to straddle and fit against the sides of a cell D, to which the arms are firmly fastened by bolts, the cog-wheel thus formed serving also to reinforce the cells which it encircles transversely; and for driving the cog-wheel I provide to mesh with it a pinion H' on a shaft $i$, journaled in proper position in the sides of the tank and carrying at one projecting end a worm-wheel $h$, engaged by a worm $h'$ on a drive-shaft $g$, journaled in proper position in bearings $f$ provided on an outer side of the tank, the drive-shaft carrying a tight pulley $e$ and a loose pulley $e'$.

The operation is as follows: The tank A being filled up to the water-line $x$ with water (which may be introduced through an opening G) the liquid is set to boiling by injecting steam into it, as through a pipe, (indicated at $s$ in Fig. 1.) To carry off the steam from the tank I provide a ventilator I, comprising the pipe-legs $d$ $d$ opening into the tank through its cover adjacent to the opposite openings G and discharging into a stack $d'$ which may lead through the roof of the building. The particular arrangement of this ventilator affords the advantage of tending to prevent waste of heat from the boiling water in the tank by circulation into contact with its surface of the outside air through the openings G, since the draft through the legs $d$ directs the air-circulation immediately to the ventilator through said openings, thereby tending moreover to retard the egress of steam and the more to prevent loss of heat by evaporation.

By driving the shaft $g$, as through the medium of a belt (not shown) connecting the pulley $e$ with the driving-power, (also not shown,) the cog-wheel H is slowly rotated in the direction indicated by the arrow at $a$ on Fig. 1, thereby slowly rotating the carrier to bring a cell D into alignment with the openings G, when while the rotation of the carrier continues the trays E loaded with cans F may be shoved one after another into the cell-tiers D' and $D^2$ until the latter are filled. Thus while the carrier is being rotated each cell D may be charged with cans.

To render unnecessary the exercise of particular care in filling a cell-tier to prevent shoving a tray too far inward, whereby it would extend into the farther opening G and be injured and injure the apparatus by continued rotation of the carrier, I provide an automatic arresting attachment for the driving mechanism which, as shown, involves the construction described as follows: A rock-shaft $c$ is journaled on the top of the tank to extend transversely across it with its ends projecting beyond the sides adjacent to corresponding sides of the openings G, and at its opposite ends the shaft carries depending arms K and K', each provided near its lower end with an inward-projecting boss $b$, which should reach through the respective opening G to or slightly beyond the inner surface of the tank. One of these depending arms has connected with it at its lower end a rod $b'$, which extends thence to the pulleys $e'$ $e$, adjacent to which it is supported in a suitable bearing $b^2$ and at which it is provided with a belt-shifting fork of usual construction and indicated at $b^3$. Thus if a tray E should be so placed in a cell D that it projects into the plane of an opening G in the rotation of the carrier the tray will contact with an adjacent boss $b$, thereby rocking the shaft $c$ and drawing backward the rod $b'$, with its belt-shifter sufficiently to shift the belt from the tight to the loose pulley and thereby automatically arresting the carrier. The attention of an attendant being directed to the condition of the apparatus by the stoppage, he may adjust the projecting tray into proper position and thereupon again start the motion of the carrier, thus insuring the apparatus against injury.

The speed of rotation of the carrier may be so timed that the period required for its complete rotation is that for subjecting the contents of a can F for properly cooking them to boiling in the water contained in the tank. Then as a cell D with its cooked contents is brought into coincidence with the openings G without stopping the motion of the carrier a fresh supply of trays filled with cans containing uncooked material may be introduced into the cells from one end by shoving the trays into the tiers and thereby shoving out of the latter at their opposite ends and through the adjacent opening G the trays containing the finished cans. Thus expedition may be attained in supplying and emptying the cooker by saving practically one operation; but it would be within my invention to provide only one of the openings G through which to introduce and withdraw the cans, though thereby the advantage of expedition would be materially curtailed.

According to the modified construction represented in Fig. 4, the cells are provided in the form of tubes D³, extending across the wheels C, to which they may be fastened, when the tubes should also be fastened one to other and to the cog-wheel H, which encircles them transversely, and the diameter of each tube is such as to adapt it to admit cans F, which are inserted endwise into it in file.

The details of construction herein shown and described as composing my improved cooker are the best known to me for its purpose. I do not, however, limit my invention to these details, as the construction may be variously modified without departure from the principle of my invention.

What I claim as new, and desire to secure by Letters Patent, is—

1. A canned-goods cooker, comprising a tank affording a boiler for the cooking liquid and provided in opposite sides with openings G, and a ventilator formed with pipe-legs opening into the tank above and adjacent to said openings and having a stack into which said legs discharge, and a can-carrier in the tank supported on a horizontal axis to rotate through a vertical plane in said cooking liquid, substantially as and for the purpose set forth.

2. A canned-goods cooker, comprising a tank affording a boiler for the cooking liquid and provided with an inlet and outlet for introducing and withdrawing the cans, a rotary can-carrier in the tank, driving-gear for said carrier and an automatic belt-shifting attachment extending between said outlet and inlet and said driving-gear and into position to be engaged and actuated by an object projecting from said carrier, in rotating, into said outlet and inlet, substantially as and for the purpose set forth.

3. A canned-goods cooker, comprising a tank affording a boiler for the cooking liquid and provided in opposite sides, respectively, with an inlet-opening and an outlet-opening for the cans, a rotary can-carrier in the tank, driving-gear for said carrier having a drive-shaft carrying a tight pulley and a loose pulley, and a belt-shifting attachment comprising a rock-shaft c carrying arms K depending adjacent to said openings and provided with projections b and a rod b' connected at one end with a depending arm K and provided at its opposite end with a belt-shifting device extending adjacent to said pulleys, substantially as and for the purpose set forth.

4. A canned-goods cooker, comprising a tank affording a boiler for the cooking liquid and provided with an inlet and outlet for introducing and withdrawing the cans, a rotary can-carrier in the tank, and cells supported on said carrier and accessible at their ends, through said inlet and outlet, substantially as and for the purpose set forth.

5. A canned-goods cooker, comprising a tank affording a boiler for the cooking liquid and provided in opposite sides with openings G, a rotary can-carrier in the tank, and cells open at their opposite ends, and supported on said carrier to coincide, in its rotation, at their open ends with said openings, substantially as and for the purpose set forth.

6. A canned-goods cooker, comprising a tank affording a boiler for the cooking liquid and provided with an inlet and outlet for introducing and withdrawing the cans, a rotary can-carrier in the tank, and open-ended cells each formed in tiers and extending radially from said carrier to coincide, at their open ends, in the rotation of the carrier, with said outlet and inlet, substantially as and for the purpose set forth.

7. A canned-goods cooker, comprising a tank, affording a boiler for the cooking liquid and provided with an inlet and outlet for introducing and withdrawing the cans, a rotary can-carrier in the tank, cells supported on said carrier and accessible at their ends through said inlet and outlet, a cog-wheel encircling said cells transversely in the tank and connected with said carrier to rotate with it, and driving-gear for the cog-wheel, substantially as and for the purpose set forth.

8. A canned-goods cooker, comprising a tank affording a boiler for the cooking liquid and provided with an opening G, a rotary can-carrier in the tank, open-ended cells supported on said carrier to extend radially therefrom, a cog-wheel formed in segments fastened together and to said cells and encircling the latter transversely, and driving-gear for the cog-wheel, substantially as and for the purpose set forth.

9. A canned-goods cooker, comprising a tank A provided with an opening G, peripherally-flanged rotary wheels C journaled to rotate in the tank and having flattened peripheral seats l, and open-ended cells extending across said wheels and fastened upon said seats to extend radially therefrom and coincide at their open ends with said opening in the rotation of the wheels, substantially as and for the purpose set forth.

10. A canned-goods cooker, comprising a tank A provided with openings G in opposite sides, a rotary can-carrier in said tank, comprising wheels C flattened on their peripheries to afford seats l and journaled in the tank, cells D formed in tiers D' and D² open at both ends and fastened to said seats to project radially from the wheels across which they extend to coincide at their open ends with said openings G in the rotation of the carrier, a cog-wheel H transversely encircling and connected with the cells in the tank, and driving means for said cog-wheel comprising a pinion H' on a shaft i carrying a worm-wheel h, and driving worm-shaft g meshing with said worm-wheel, the whole being constructed and arranged to operate substantially as and for the purpose set forth.

THEOPHILUS VAN KANNEL.

In presence of—
M. J. FROST,
J. H. LEE.